(12) United States Patent
Reed

(10) Patent No.: US 6,551,504 B2
(45) Date of Patent: Apr. 22, 2003

(54) VALVE FOR A FLUID TREATMENT SYSTEM

(75) Inventor: Kenneth Orr Reed, Kenosha, WI (US)

(73) Assignee: USF Consumer & Commercial Watergroup, Inc., Northbrook, IL (US)

(*) Notice: Subject to any disclaimer, the term of this patent is extended or adjusted under 35 U.S.C. 154(b) by 0 days.

(21) Appl. No.: 09/904,027

(22) Filed: Jul. 12, 2001

(65) Prior Publication Data

US 2003/0010688 A1 Jan. 16, 2003

(51) Int. Cl.[7] .............................................. F16K 31/18
(52) U.S. Cl. .................... 210/97; 210/126; 210/127; 210/790; 137/430; 137/484.2; 137/426; 137/423; 137/433
(58) Field of Search ................................ 210/123, 126, 210/127, 190, 670, 119, 86, 97; 137/423, 430, 268, 425, 426, 433, 435, 51, 52, 484.2, 484.6; 251/318

(56) References Cited

U.S. PATENT DOCUMENTS

| | | |
|---|---|---|
| 2,098,131 A | 11/1937 | Bluhm |
| 3,039,949 A | 4/1962 | Whitlock |
| 3,049,237 A | 8/1962 | Whitlock et al. |
| 3,095,005 A | 6/1963 | Thompson |
| 3,185,302 A | 5/1965 | Kryzer |
| 3,326,377 A | 6/1967 | Abos |
| 4,196,482 A | 4/1980 | Mendez |
| 4,228,000 A | 10/1980 | Hoeschler |
| 4,374,025 A | 2/1983 | Loke |
| 4,421,652 A | 12/1983 | Heskett |
| 4,748,999 A | 6/1988 | Delwiche |
| 4,889,623 A | 12/1989 | Prior et al. |
| 5,176,167 A | 1/1993 | Tiao |
| 5,630,443 A | 5/1997 | Rosenberg |
| 6,238,567 B1 * | 5/2001 | Van de Moortele |

FOREIGN PATENT DOCUMENTS

| | | |
|---|---|---|
| DE | 1109473 | 1/1961 |
| FR | 2435648 | 4/1980 |

OTHER PUBLICATIONS

Clack Corporation, ¾" *Commercial Brine Valves*, Models 454,464 & 434, USA, 1993.
Culligan International Co., *Hi–Flo 55 Water Softeners, Installation and Operating Manual*, Models from 1992, USA, 1995, p. 1–18.
L.W. Fleckenstein, Inc., *Safety Brine Valve Assembly Model 2300*, USA. 1995.
Matt–son Inc., *Brine Control Valves*, Form BCV–01 thru 06, USA, 1999.
Culligan International Co., *Hi–Flo 55 Water Softeners Models From 1992*, Parts List, USA, 2000, p. 1–15.
Bruner Service Manual, *Service and Installation of the Capacitrol Brinemaker*, Section C–2, p. 19–21, 46 & 48.
Bruner Service Manual, *Hi–Flo 7 Brine Safety Valve*, p. 20.
L.W. Fleckenstein, Inc., *Brine Valve, Model 400 A Brine Valve, Model 500 Air Check, Assembly Manual*, USA.
L.W. Fleckenstin, Inc., *Commercial Safety Brine Valve, Model 2350, Assembly Manual*, USA.

* cited by examiner

Primary Examiner—Joseph W. Drodge
Assistant Examiner—Terry K. Cecil
(74) Attorney, Agent, or Firm—Greer, Burns & Crain, Ltd.

(57) ABSTRACT

A valve in a fluid treatment system adapted for controlling the flow of fluid between a source and a treatment media disposed in a treatment chamber. The valve includes a housing having a fluid passageway between an inlet and an outlet; a containment chamber; and a sealing member reciprocal between a first position in which the sealing member is retained in the containment chamber out of the flow of fluid in the passageway and a second position that seals the outlet. The containment chamber also includes a drain opening, which can be a venturi, for emptying the containment chamber of fluid.

21 Claims, 3 Drawing Sheets

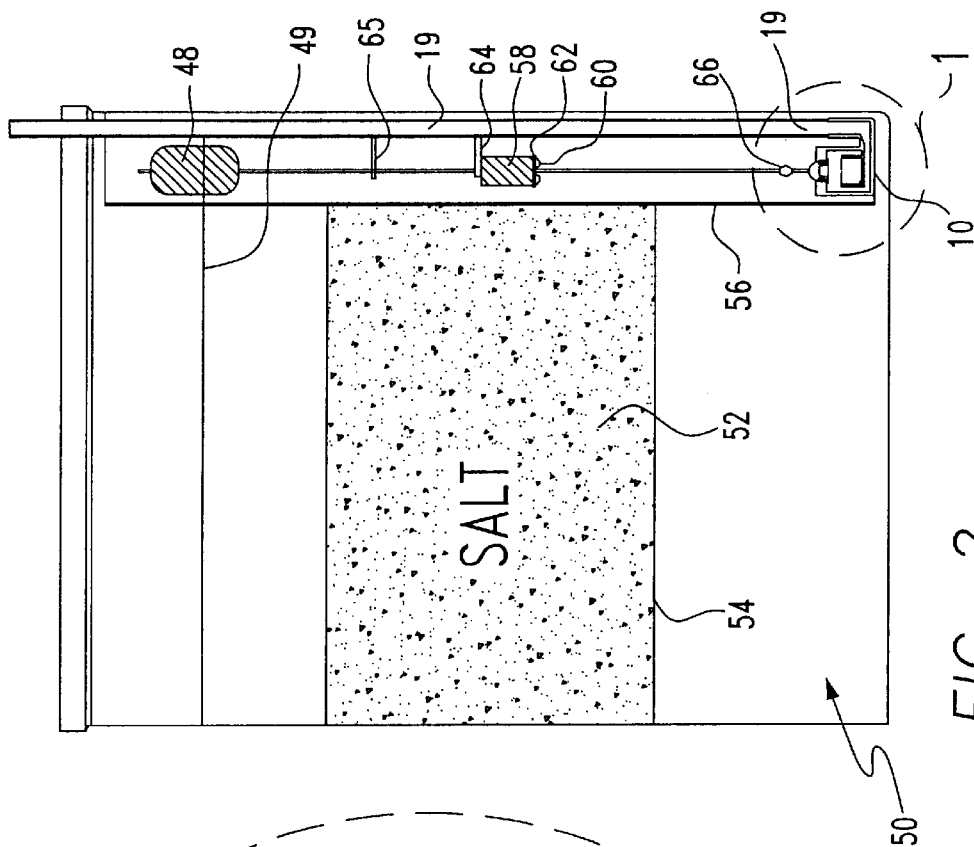
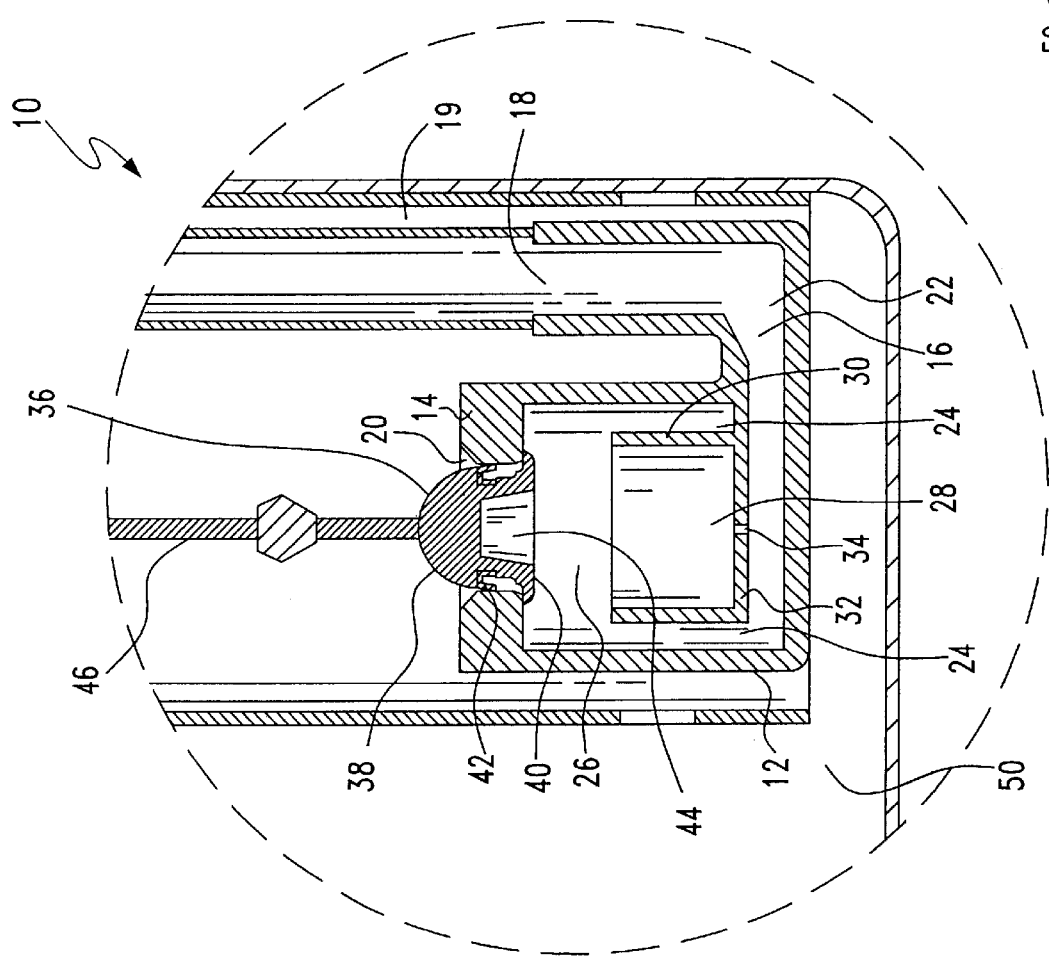

VALVE FOR A FLUID TREATMENT SYSTEM

BACKGROUND OF THE INVENTION

The present invention relates generally to water treatment tanks of the type used to retain resin beads in a water softener system. More particularly, the present invention relates to an improved valve for controlling the flow of clean water and brine solution to and from a brine tank for the regeneration of resin beads.

Brine valves are an important part of almost all water softener systems. When used with a softener valve/controller and a brine tank, a brine valve controls the flow of brine solution from a brine tank when regenerating softener resin. It controls the flow of incoming fresh water into the tank to create fresh brine. If a brine valve does not shut off securely, flooding and property damage will result.

Reports have shown that brine valves are vulnerable to high velocity pressure spikes or surges. These pressure surges can cause the valve to shut off prematurely or "pre-seat" during refill, resulting in incomplete filling of the brine tank and resulting in subsequent incomplete resin regeneration. Most brine valves include a flow restrictor that absorbs most pressure spikes. In addition, most brine draw shut-off valves are check balls. These check ball valves are very sensitive to out-of-tolerance dimensions and brine tank contaminants, which makes it difficult to obtain a good seal.

Additionally, the conventional check ball design creates an obstacle to the flow of fluid in an out of the brine valve. This reduces the efficiency of the valves by decreasing the flow rate of fluid in and out of the valves and the subsequent time needed to create and draw brine.

Thus, a main object of the present invention is to provide an improved brine valve that makes a reliable watertight seal within the brine tank, replacing the unreliable ball check design.

Another object of the present invention is to provide an improved valve plug that prevents "pre-seating" and allows for the complete filling of the brine tank and subsequent complete resin regeneration.

Still another object of the present invention is to provide an improved valve check design that keeps the valve sealing member out of the flow of fluid entering and exiting the valve.

BRIEF SUMMARY OF THE INVENTION

The above-listed objects are met or exceeded by the present valve for a fluid treatment system, featuring a refill seat which is held out of the flow of fluid in a containment chamber by float weights as water enters the brine tank, thus preventing the "pre-seating" found in the prior brine valves. In addition, the plug is held securely in place by a float when the fluid level in the brine tank reaches the appropriate level, thus overcoming the unreliability of previous brine valves using ball checks to stop fluid flow.

More specifically, the invention provides a valve for use in a fluid treatment system for controlling the flow of fluid between a source and a treatment media disposed in a treatment chamber. The valve has a housing with an inlet, an outlet, and a passageway in communication between the inlet and the outlet. Further, the present invention also includes a refill seat configured to reciprocate in the housing between a first position and a second position, with the housing having a containment chamber for retaining the refill seat in the first position out of a flow of fluid in the passageway.

In another embodiment, the invention provides a valve for use in a fluid treatment system for controlling the flow of fluid between a source and a treatment media disposed in a treatment chamber. The valve has a housing with an inlet, an outlet and a passageway in communication between the inlet and the outlet.

Furthermore, a feature of the present invention also includes a refill seat configured to reciprocate within the housing between a first position and a second position and includes a containment chamber for retaining the refill seat in the first position out of the flow of fluid. The containment chamber also incorporates a Venturi in the floor of the containment chamber in communication with the passageway to allow for drainage of the containment chamber and the proper re-seating of the refill seat in the first position

BRIEF DESCRIPTION OF THE SEVERAL VIEWS OF THE DRAWINGS

FIG. 1 is a fragmentary vertical section of the present valve at the termination of the brine tank refill;

FIG. 2 is a schematic vertical section of a brine tank suitable for use with the present valve at the termination of the brine tank refill;

DETAILED DESCRIPTION OF THE INVENTION

Figure 4:
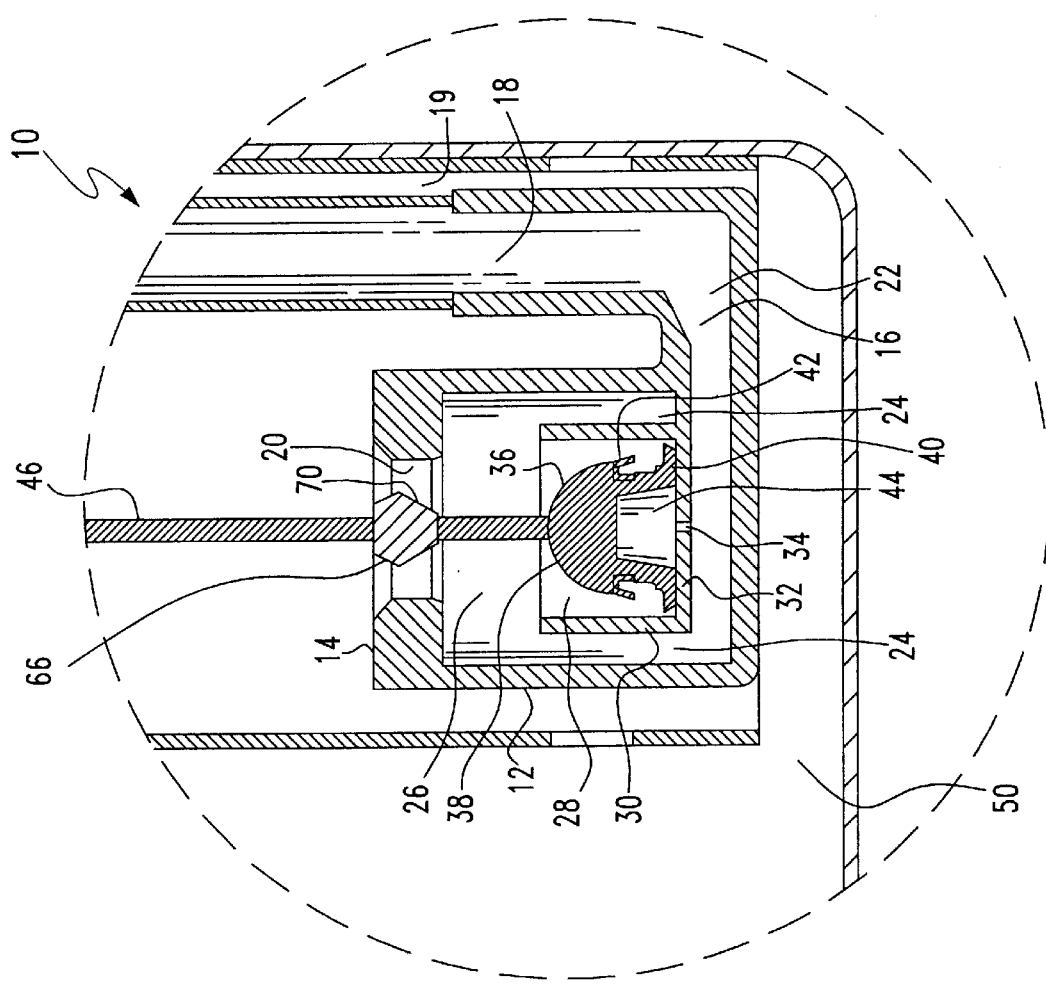
FIG. 4 is a fragmentary vertical section of the present valve shown during eduction of brine from the brine tank through the present valve.

Referring now to FIG. 1, a valve for a water treatment system is generally designated 10 and includes a housing 12 having an upper portion 14. The housing 12 is preferably cylindrical, although other configurations are also contemplated.

The housing 10 defines a passageway 16, having an inlet 18 preferably parallel in orientation to an outlet 20 in the upper portion 14 of the housing, although other orientations are also contemplated. The inlet 18 is in fluid communication with an inlet pipe 19. In the preferred embodiment the inlet 18 is threadably and sealingly engaged to the inlet pipe 19, although other types of engagement and seals are also contemplated, including chemical adhesives and ultrasonic welding.

The passageway 16 has a first portion 22 in fluid communication with the inlet 18 and being perpendicularly oriented to a second portion 24 in fluid communication with the outlet 20. In the preferred embodiment, the second portion 24 of the passageway 16 is cylindrical in structure when viewed in plan to reduce the size and use of materials in construction of the valve 10, and yet retain an adequate volume for fluid communication between the outlet 20 and the inlet 18. However, other shapes and configurations are also contemplated depending on the application.

The second portion 24 of the passageway 16 is in fluid communication with the outlet 20 via a passage chamber 26 situated between the outlet and a containment chamber 28, the latter being defined by a cylindrical wall 30 and a floor 32. While in the preferred embodiment the wall 30 of the containment chamber is cylindrical in shape, other shapes and configurations are also contemplated depending on the application. In the floor 32 of the containment chamber 28 is a drain opening 34 in fluid communication with the first portion 22 of the passageway 16 and having a relatively smaller diameter than the passageway. In the preferred embodiment the drain 34 forms a Venturi.

The containment chamber 28 is constructed and arranged to accommodate a sealing member 36 in a first position out of the flow of fluid passing through the passage chamber 26. This allows for an increased flow rate of fluid through the outlet 20 by removing the obstruction of the sealing member 36 during a portion of the operation cycle of the valve. In the preferred embodiment, the sealing member 36 is a refill seat 38, and is generally dome-shaped with a flat base 40.

At least one seal 42 is disposed about a circumference of the sealing member 36 so that when the sealing member is in a second position adjacent the outlet 20, it forms a seal with the outlet in the upper portion 14 of the housing 12. While in the preferred embodiment, the seal 42 on the sealing member 36 is a lip seal or wiping-type seal, other seals as known in the art are also contemplated for establishing a seal of the outlet 20 including, but not limited to O-rings. In addition, the seal 42 on the sealing member 36 may be replaced by placing a seal about the circumference of the outlet 20 to form a seal with the sealing member when it is in the second position.

A chamber 44 is defined by the base 40 of the sealing member 36 that allows for the complete draining of the containment chamber 28 by the Venturi when the sealing member is in the first position. The Venturi also holds the sealing member 36 in the first position by a vacuum created by low pressure when fluid exits the valve 10.

Referring now to FIGS. 1 and 2, the sealing member 36 is connected by a rod 46 to a refill float 48 (best seen in FIG. 2) that allows the sealing member to reciprocate between the first position (best seen in FIG. 4) and the second position (best seen in FIG. 1) with variations in the level of fluid 49 in a treatment tank 50.

The refill float 48 also acts as a refill weight and holds the sealing member 36 in the first position to prevent "pre-seating" of the sealing member until the fluid level 49 in the treatment tank 50 reaches the refill float. As is known in the art, the volume of brine produced can be varied by the placement of the refill float 48 along the length of the rod 46.

In the preferred embodiment, the treatment tank 50 is a brine tank configured to accommodate a supply of salt 52 upon a porous platform 54. The present brine valve 10 is located within a generally vertically oriented, tubular brine well 56. It is preferred that the brine well 56 is porous to water but not to salt particles to protect the valve 10 and related components.

Figure 6:
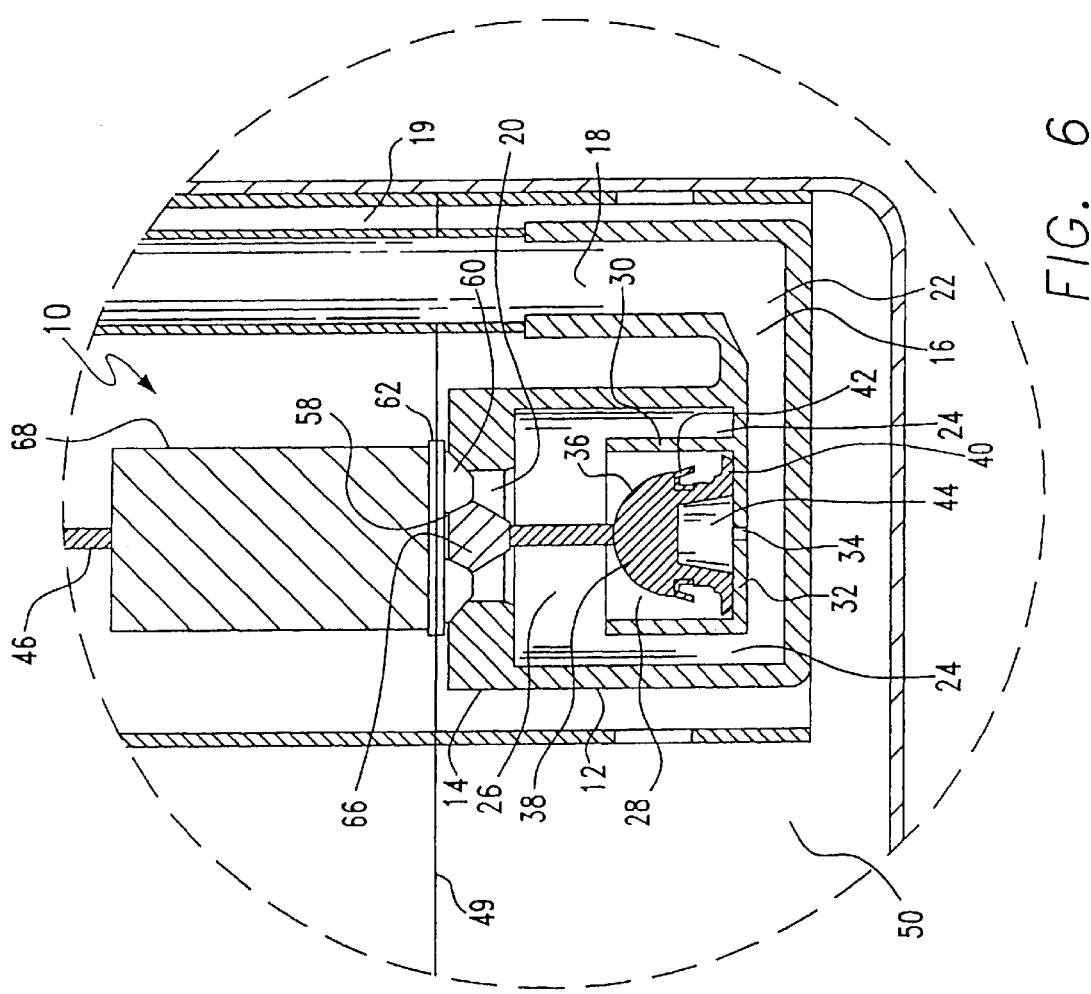
FIG. 6 is a fragmentary vertical section of the present valve at the termination of education of brine from the brine tank.
Figure 5:
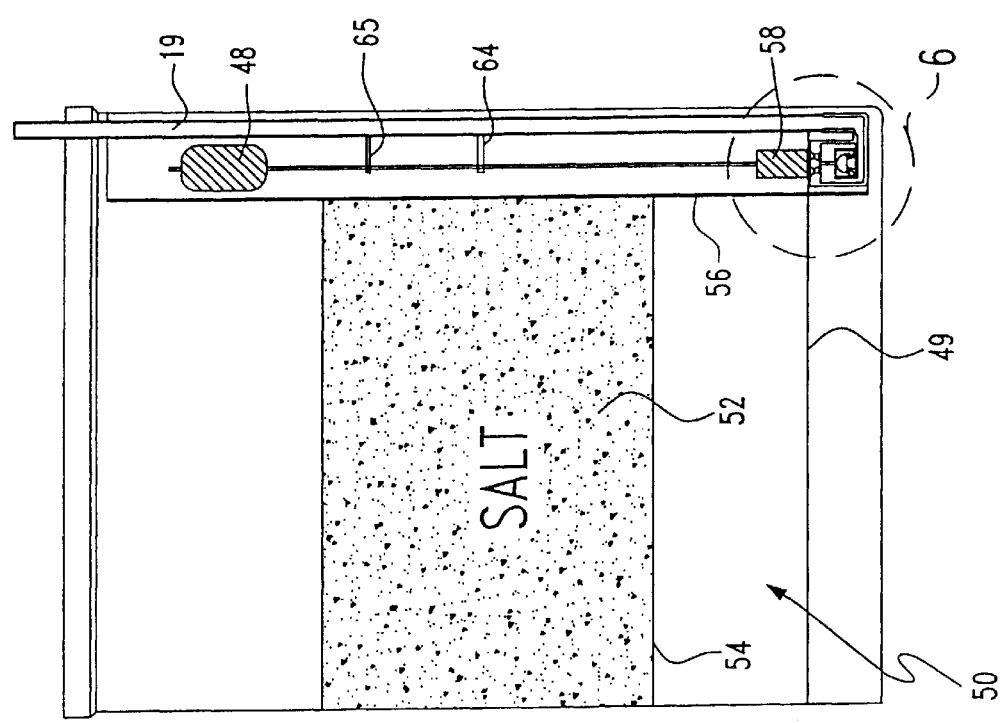
FIG. 5 is schematic vertical section of a brine tank suitable for use with the present valve at the termination of eduction of brine from the brine tank.

Referring now to FIGS. 5 and 6, attached and slideable in relation to the rod 46 is an eductor float 58 having at least one seal 60 preferably attached to a base 62. Attached to the rod 46 is a generally horizontally projecting stop 64 that prevents the eductor float 58 from rising beyond a designated level along the rod. In the preferred embodiment, the stop 64 is secured to the inlet pipe 19, and prevents the rod 46 from horizontal movement. Further support to the rod 46 is preferably provided by a support bracket 65. While in the preferred embodiment one additional support bracket 65 is present, additional support brackets are also contemplated depending upon the application.

Preferably provided in the shape of a donut which depends from the base 62, the seal 60 is configured to create a secure seal between the upper portion 14 of the housing 12, specifically the outlet 20, and the treatment tank 50 at the end of brine draw. In the preferred embodiment, the eductor float 58 is generally cylindrical in shape, although other shapes are also contemplated. An eductor seat 66 is attached to the rod 46 and is configured to seal a space 68 between the rod and an inner bore (not shown) of the eductor float 58 when the eductor float has created a seal with the housing 12 at the end of brine draw. In the preferred embodiment, the eductor seat 66 has a conical lower portion 70 in shape to allow for a greater surface area to grip the rod 46, to cut material costs in construction of the valve 10 and to reduce the volume of space the eductor seat occupies when fluid is entering or exiting the outlet 20. While in the preferred embodiment, the eductor seat 66 is generally diamond-shaped in cross section, other shapes are also contemplated depending on the application.

Referring now to FIGS. 1 and 2, in operation, the treatment tank 50 has been filled with fluid at a level 49 through the pipe 19 and the valve 10. When the level of fluid 49 (typically water or a water/salt solution) in the treatment tank 50 reaches the appropriate level, the buoyant force of the refill float 48 overcomes the downward force of the weights and carries the refill seat 38 through the passage chamber 26 to a second position, in which the refill seat creates a seal of the outlet 20 at the upper portion 14 of the housing 12, thus preventing the further flow of fluid into the treatment tank 50. The eductor float 58 is held by the stop 64, and is prevented from colliding with the refill float 48. Brine is being made in the treatment tank 50 and the system is ready to regenerate the softener resin (not shown).

Figure 3:
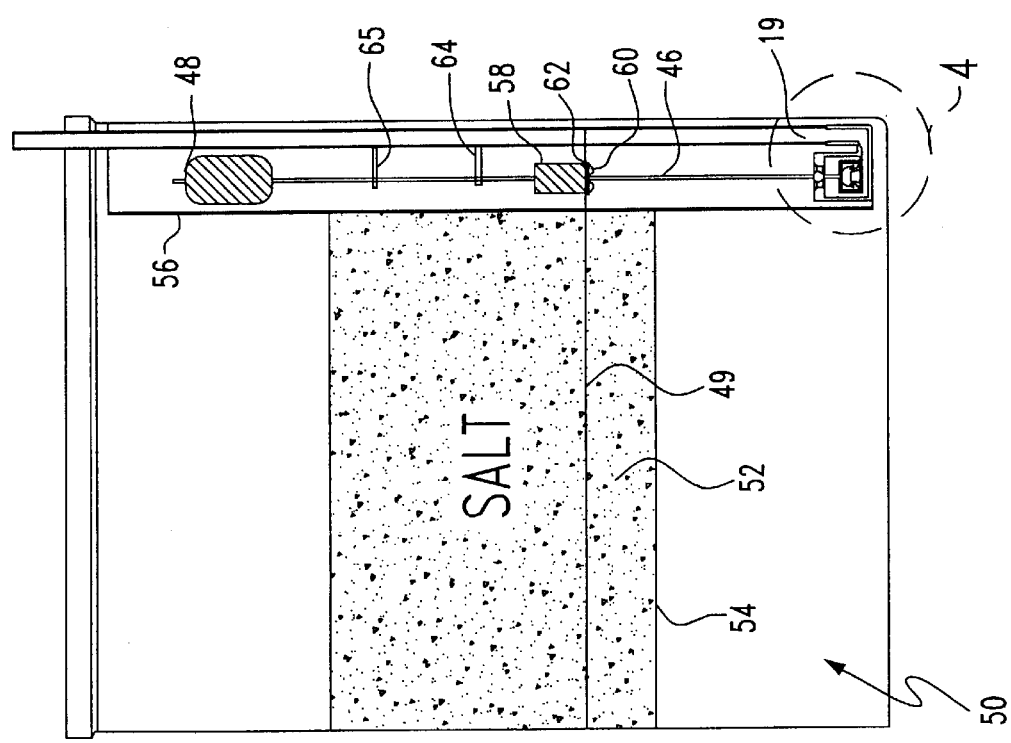
FIG. 3 is a schematic vertical section of a brine tank suitable for use with the present valve during eduction of brine from the brine tank.

Referring now to FIGS. 3 and 4, when the control valve (not shown) is advanced to brine draw (eduction), low pressure develops in the inlet pipe 19. A resulting pressure differential causes the refill seat 38 to fall away from the upper portion 14 of the housing 12 and brine is allowed to flow through the outlet 20, the Venturi 34 and out through the passageway 16 and the inlet 18. In this manner, the Venturi 34 drains the containment chamber 28. The base 40 of the refill seat 38 is prevented from sealing the Venturi 34 by the upward buoyant force of the refill float 48 until the brine level drops to a low level above the inlet 18. The refill seat 38 is held in a first position in the containment chamber 28 by the weight of the refill float 48 until eduction is complete. In this manner, the flow through the passage chamber 26 is not obstructed by the refill seat 38.

Referring now to FIGS. 5 and 6, as the brine level within the treatment tank 50 falls, the eductor float 58 is carried down with the level of the fluid 49 until the seal 60 on the eductor float base 62 creates a seal with the outlet 20 in the upper portion 14 of the housing 12. A seal is created by the eductor seat 66 in the space 68 between the eductor float and the rod 46. The seal created by the eductor float 58 and the eductor seat 66, and maintained by the low pressure within the inlet pipe 19, prevents air from entering the inlet pipe at the end of the brine draw.

To refill the tank 50, fresh water is introduced into the inlet pipe 19, overcomes the force of the seal created by the eductor float 58, and achieves the level 49 shown in FIG. 2. At that point, the refill float 48 pulls the rod 46 upward to the second position of the refill seat 38 (best seen in FIG. 1).

Thus, it will be seen that the present valve provides a structure that facilitates obstruction-free flow through the interior fluid flow passageway. Accordingly, more efficient delivery of brine is obtained, without being subject to pressure spikes. Also, the Venturi 34 further ensures that the refill seat 38 will not obstruct flow during brine draw.

While particular embodiments of the valve for a fluid treatment system have been shown and described, it will be appreciated by those skilled in the art that changes and modifications may be made thereto without departing from the invention in its broader aspects and as set forth in the following claims.

What is claimed is:

1. A valve in a fluid treatment system adapted for controlling the flow of fluid between a source and a treatment media disposed in a treatment chamber comprising:
a housing having an inlet, an outlet, and a passageway in communication between said inlet and said outlet;
a sealing member configured to reciprocate in said housing between a first position and a second position, said second position sealing said outlet;
said housing having containing means configured for retaining said sealing member in said first position out of a flow of fluid in said passageway; and
said containing means including a drain means in fluid communication with said passageway for emptying said containing means of fluid.

2. The valve of claim 1, wherein a portion of said passageway defines a passage chamber, and said containing means defines a space for retaining said sealing member out of the flow of fluid through said passage chamber, said containing means is in fluid communication with said passage chamber.

3. The valve of claim 2, wherein said passage chamber is between said containing means and said outlet.

4. The valve of claim 2, wherein said containing means is configured and disposed relative to said passage chamber so that said sealing member is moveable from said first position to said second position by moving through said passage chamber.

5. The valve of claim 1, wherein said drain means is a Venturi having a relatively smaller diameter than a diameter of said passageway.

6. The valve of claim 1, wherein said containing means is a chamber having a floor and said drain means is an aperture in said floor in communication with said passageway.

7. The valve of claim 6, wherein said aperture is a Venturi.

8. The valve of claim 1, wherein said passageway has two portions, a first portion receives a fluid flow from said inlet and a second portion is dimensioned to accommodate said containing means within said housing.

9. The valve of claim 8, wherein said second portion of said passageway is cylindrical in shape when viewed in plan.

10. The valve of claim 1, further including a rod attached to said sealing member and a moveable float slideable relative to said rod, said float having at least one seal and constructed and arranged for sealing said outlet, and an eductor seat fixed to said rod for sealing a space between said rod and said float.

11. The valve of claim 10, wherein said sealing member further comprises a weighted float fixed to said rod, above said moveable float, which allows said sealing member to reciprocate between said first position and said second position as the level of fluid varies within the treatment chamber and maintains said sealing member in said first position until the fluid has reached said float.

12. The valve of claim 1, wherein said sealing member further includes a refill seat fixed to a rod, and having a circumference and at least one seal about said circumference said at least one seal configured for sealing said outlet when said sealing member is in the second position, said sealing member also having a base configured for sealing said drain means when said sealing member is in said first position.

13. The valve in claim 1, wherein said sealing member is constructed and arranged so that when in said first position a flow of a fluid is enabled between said inlet and into the treatment chamber through said outlet.

14. The valve in claim 1, wherein said sealing member is constructed and arranged so that when in said second position said sealing member prevents a further flow of fluid from said inlet into the treatment chamber through said outlet.

15. A valve in a fluid treatment system adapted for controlling the flow of fluid between a source and a treatment media disposed in a treatment chamber, comprising:
a housing having an inlet, an outlet, and a passageway in communication between said inlet and said outlet, a portion of said passageway defines a passage chamber;
a sealing member configured to reciprocate in said housing between a first position and a second position, and said housing having a containment chamber configured for retaining said sealing member in said first position out of a flow of fluid in said passageway and being in fluid communication with said passage chamber so that said sealing member is moveable to said second position for sealing said outlet, wherein said containment chamber includes a drain in fluid communication with said passageway for emptying said containment chamber of fluid.

16. The valve of claim 15, wherein said passage chamber is disposed between said containment chamber and said outlet.

17. The valve of claim 16, wherein said containment chamber is configured relative to said passage chamber so that said sealing member is moveable from said first position to said second position by moving through said passage chamber.

18. The valve of claim 15, further including a rod attached to said sealing member and a moveable float slideable relative to said rod, said float having at least one seal and constructed and arranged for sealing said outlet, and an eductor seat fixed to said rod for sealing a space between said rod and said float.

19. The valve of claim 18, wherein said sealing member further includes a refill seat fixed to a rod, having at least one seal about a circumference of said refill seat for sealing said outlet when said sealing member is in the second position, and said sealing member also having a base for sealing a drain when said sealing member is in the first position.

20. A valve for use in a fluid treatment system adapted for controlling the flow of fluid between a source and a treatment media disposed in a treatment chamber comprising:
a housing having an inlet, an outlet and a passageway in communication between said inlet and said outlet;
a sealing member configured to reciprocate in said housing between a first position out of direct fluid flow in said passageway and a second position in which said sealing member seals said outlet and
a containment chamber configured for retaining said sealing member in said first position out of the flow of fluid and having a Venturi in a floor of said containment chamber in fluid communication with said passageway.

21. The valve in claim 20, wherein said sealing member includes a refill seat having at least one seal constructed and arranged for sealing said outlet when said sealing member is in said second position, and having a base constructed and arranged such that when said sealing member is in said first position said Venturi is sealed.

* * * * *

UNITED STATES PATENT AND TRADEMARK OFFICE
CERTIFICATE OF CORRECTION

PATENT NO.     : 6,551,504 B2
DATED          : April 22, 2003
INVENTOR(S)    : Reed It is certified that error appears in the above-identified patent and that said Letters Patent is hereby corrected as shown below:

<u>Title page,</u>
Item [73], Assignee, delete "Watergroup, Inc." and insert -- WaterGroup, Inc. --.

Signed and Sealed this

Nineteenth Day of August, 2003

JAMES E. ROGAN
*Director of the United States Patent and Trademark Office*